United States Patent [19]

Weet

[11] 4,022,638
[45] May 10, 1977

[54] CONTINUOUS RECOVERY OF BASE METAL FROM INSULATED WIRE SCRAP

[75] Inventor: James H. Weet, Mars, Pa.

[73] Assignee: Dart Industries Inc., Los Angeles, Calif.

[22] Filed: Aug. 5, 1975

[21] Appl. No.: 602,111

[52] U.S. Cl. .................................. 134/1; 34/12; 34/164; 134/6; 134/10; 134/25 R; 134/28; 134/30; 134/32; 134/34; 134/41; 134/132; 198/756; 198/778; 209/10; 241/24

[51] Int. Cl.² .......................... B08B 3/08; B08B 3/10

[58] Field of Search ............. 134/1, 6, 10, 14, 18, 134/25 R, 28, 30, 32, 34, 41, 132; 209/10, 434, 440; 75/111, 115, 117, 121; 423/27, 28, 38, 41, 113, 132; 241/24, 25; 193/12; 198/220 BC, 136, 756, 778; 34/12, 39, 61, 164

[56] References Cited

UNITED STATES PATENTS

| | | | |
|---|---|---|---|
| 2,094,786 | 10/1937 | Flint ..................................... | 34/164 |
| 2,744,066 | 5/1956 | Spiess, Jr. et al. ............ | 134/25 R X |
| 2,760,504 | 8/1956 | Spurlin ............................. | 134/132 |
| 2,799,383 | 7/1957 | Spurlin ....................... | 198/220 BC X |
| 3,216,431 | 11/1965 | White ............................... | 134/132 |
| 3,258,852 | 7/1966 | White ................................ | 34/164 |
| 3,292,775 | 12/1966 | White ............................ | 134/132 X |
| 3,480,477 | 11/1969 | Levin ............................. | 134/25 R |
| 3,749,322 | 7/1973 | Reynolds ........................... | 241/24 |
| 3,905,556 | 9/1975 | Drage ............................... | 241/24 |

Primary Examiner—Robert L. Lindsay, Jr.
Assistant Examiner—Richard V. Fisher
Attorney, Agent, or Firm—Parmelee, Miller, Welsh & Kratz

[57] ABSTRACT

A procedure and apparatus are shown for on a continuous, commercially practical basis recovering a non-ferrous base metal, such as copper or aluminum in the form of clean, bright metal pieces or bits and for enabling recovery of different non-ferrous coating metals, such as of lead, tin or alloys thereof, and under conditions in which a resin insulating coating may be present. Mechanical shredding means is used for reducing insulated wire to an aggregate containing bits, particles or pieces within a requisite size range, extraneous magnetics are removed, and the content of resin coating material is reduced under dry conditions to within a maximum of 2%. A preliminary step for attaining a less than 2% resin content importantly includes moving the aggregate as a vibration-activated, dry, fluid mass of substantially uniform thickness upwardly along a spiral path while separating the material into heavier and lighter portions, with the lighter innermost portion being recycled to further concentrate the metal bit content thereof and to further minimize the resin content thereof.

After the resin content has been thus reduced, and the metal bit content maximized, the aggregate is again moved along a fluidized helical path in a vibration-activated stream of substantially uniform thickness upwardly, while applying a reactive chemical solution thereto in a counterflow path downwardly, with a substantially full area of exposure of the metal bits to the solution during its upward movement.

27 Claims, 23 Drawing Figures

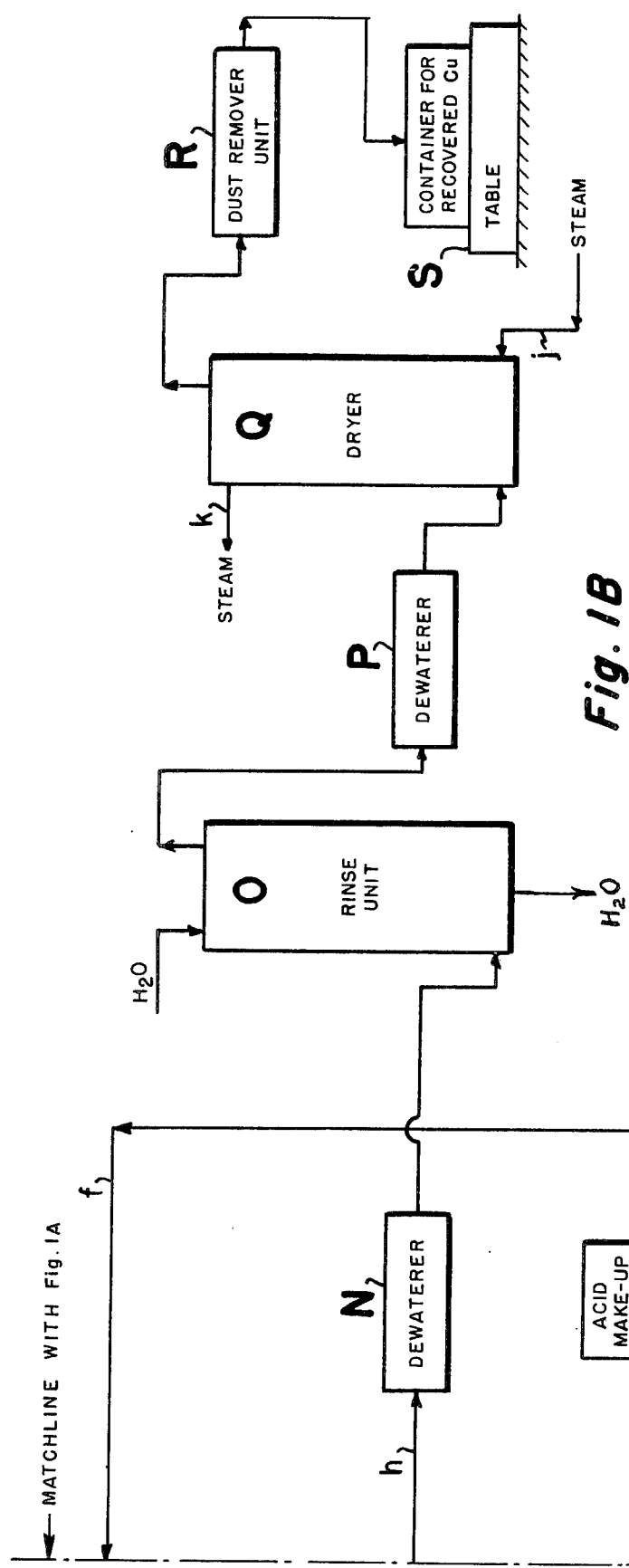

CONTINUOUS RECOVERY OF BASE METAL FROM INSULATED WIRE SCRAP

BACKGROUND OF THE INVENTION

1. Field of the Invention

This invention relates or pertains to a commercially practical procedure and apparatus for recovering the metal and particularly, the base metal content of wire scrap which is to be salvaged. A phase of the invention deals with a critically controlled procedure for recovering the base metal content of metal coated scrap wire in a substantially clean and bright condition, and optionally with recovery of the coating metal after it has been stripped from the base metal.

2. Description of the Prior Art

Various approaches have been attempted in the recovery of insulated electric wire scrap, but none have been commercially practical or capable of a continuous, fully integrated operation, and which will enable the base metal to be substantially fully recovered and in the form of substantially pure, non-oxidized bright metal. In endeavoring to find a solution to the problem presented, it should be noted that it involves the presence of an adherent, enclosing insulation of resin material, and of a molecular-like adherence of a metal coating under the resin coating and about the base metal.

One investigator endeavored to make use of the insulation in burning the aggregate, but this involves an ecological air pollution problem from the standpoint of a typical resin, such as PVC (polyvinylchloride) or polyethylene. Removal may be relatively simple where the scrap wire merely involves a non-ferrous base metal wire having a resin coating, but becomes very complicated where, as usually, the base metal wire is coated with another non-ferrous metal, such as with lead, tin or alloy thereof. In this situation, the factor of effectively, fully removing the metal coating without wasting or damaging the base or core metal, such as of copper or aluminum must be met. The need has been for the provision of an integrated, continuous, as distinguished from an uneconomical batch type of system or procedure, for efficiently and effectively, in a commercial, high production manner, accomplishing the desired results. The batch type of procedure that has heretofore been necessary mitigates against a commercial cost-to-return practicability of attempting to recover the metal content of scrap wire.

SUMMARY OF THE INVENTION

It has been an object of the invention to find a solution to the problem of a commercially practical approach to the recovery of the metal values of metal-coated wire scrap and the like.

Another object has been to discover critical factors involved in enabling a continuous, production line recovery of the base or core metal portion of scrap wire.

Another object of the invention has been to enable the continuous salvaging of base as well as of coating metals of scrap wire that may be insulated.

A further object of the invention has been to recover the base metal, such as copper or aluminum, of scrap electrical wire in a substantially pure No. 1 grade form.

A still further object of the invention has been to discover and meet critical factors involved in solving the problem herein set forth.

These and other objects of the invention will appear to those skilled in the art from the illustrated embodiment and the claims.

BRIEF DESCRIPTION OF THE DRAWINGS

In the drawings,

FIGS 1A and 1B represent a diagrammatic layout illustrating a typical process or system employing principles of the invention wherein scrap wire material is continuously in-lined processed to strip off and, if desired, to recover its non-ferrous coating metal from a chemical stripping solution and essentially, to recover its non-ferrous base metal in metallic form.

FIGS. 2 and 2C are representations illustrating respectively, scrap wire which is to be processed, shredded bits of resin and metal coated base metal wire, metal coated base metal bits, and fully processed copper base metal bits.

Figure 15:
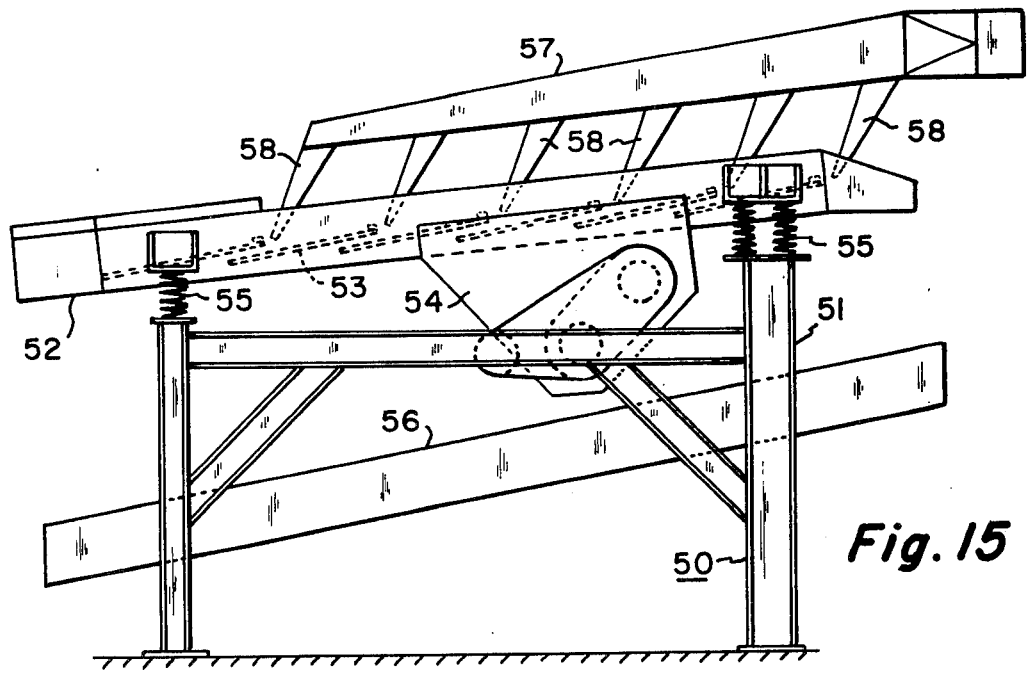
FIG. 15 is a side view in elevation of a vibration-activated conveyor unit on the scale of and somewhat similar to FIG. 14 which is suitable for removing dust from dried base metal bits of an aggregate; this unit differs from the unit of FIG. 14 from the standpoint of the positioning of its motor-driven vibrator part, and additionally shows an air supply manifold; it may also be used, with the overhead air manifold removed, as a conveyor unit with a surge hopper in a processing system of the invention for providing an even or uniform continuous supply of aggregate to a treating unit.
Figure 16:
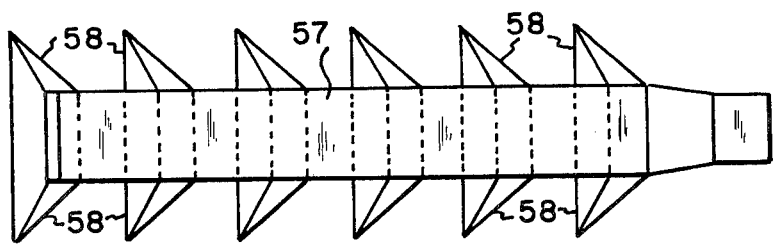

And, FIG. 16 is a top plan view of the air manifold shown in and on the scale of the unit of FIG. 15.

BRIEF DESCRIPTION OF THE INVENTION

In endeavoring to solve the problem and provide a practical process for recovering a non-ferrous base metal, such as of copper or aluminum, and optionally, for recovering a non-ferrous metal coating thereon, such as of tin, lead or an alloy thereof, in a high production, in-line, continuous manner without an appreciable or with a minimized loss of the base metal, consideration was given to the use of various chemical stripping solutions and to temperature requirements for making them effective in removing the coating metal. Consideration was also given to the usual presence of an appreciable amount of resin insulation material and the need for its removal. From the standpoint of obtaining a fully effective and clean stripping or removal of the coating metal and the elimination of any more than a permissible (2%) residue of resin material, various chemical solutions and temperatures were investigated, all with the idea of adapting their use to a continuous, as distinguished from the usual batch type of operation.

An alkaline process, such as outlined by the Jaffe U.S. Pat. No. 2,891,881, was found to be impractical, particularly in view of the relatively high temperatures required, in the neighborhood of 675° to 775° F. That is, such an above-melting point temperature for a coating or tin or lead or their alloys was found to be damaging to the base metal, even when employing an indirect heating method. The desideratum has been to provide a base metal that is relatively bright and clean and whose body has not been alloyed to the coating metal, pitted or appreciably removed during the process.

It was found that an organic or inorganic acid treating solution could be successfully used and that common inorganic acids, such as nitric, hydrochloric and sulfuric acids are practical if used with a salt of the base metal to provide a relatively high ion concentration in the solution. The salt minimizes the acid's reactiveness with respect to the base metal. Best results were obtained by the use of a relatively simple aqueous solution containing sulfuric acid and copper sulfate, as heated within a range of about 60° to 80° C. Such a solution having 200 to 220 g/l of sulfuric acid and copper sulfate as the ionizing salt in the amount of 50 to 75 g/l was found to be highly effective in removing an alloy coating of lead and tin. The weight loss of the copper base metal was practically nil, amounting to less than 0.1% and the base metal as stripped had a bright copper surface, such as seen on new water tubing and plumbing fixtures. An even brighter base metal as stripped was obtained using a further additive, such as hydrogen peroxide in the amount of 4 to 6 g/l, p-phenolsulfuric acid in the amount of 1 g/l and benzotriazole in the amount of 1 g/l, with the same above amount of sulfuric acid and copper sulfate and a temperature of about 45° to 60° C. Although the copper base metal was extremely bright in appearance, there was a weight loss of 5.4% which is about average if hydrogen peroxide is used. The dissolving of the base metal was felt to be due to the formation of an insoluble stannic oxide on the surface thereof which has to be removed by dissolving the base metal and floating the salt from the surface.

After deciding on a suitable treating solution, it was necessary to develop a process in which the solution would be effective in a continuous, in-line system. It was first determined that the scrap wire should be shredded or cut into small bits or pieces to free as much as possible of its resin coating from the wire to enable the resulting aggregate to be effectively handled, the non-ferrous metal coating to be substantially fully stripped, and the non-ferrous base metal to be recovered in a relatively bright condition. In this connection, it was decided that after preliminarily lowering the resin content to not more than 2% by volume and removing any magnetic materials in the aggregate, that a fully effective stripping-dissolving off of the non-ferrous metal coating could be obtained by vibration-activating the bits or particles of a sized aggregate to advance and subject it to the stripping action of the aqueous chemical solution. The manner of the application of the aqueous chemical solution is important to assure a substantially full and uniform stripping action on the coated base metal bits as well as to destruct the remaining resin material content. In such an operation, the resin material remaining in the aggregate to be chemically treated should be minimized, of less than about 2% by volume, to avoid blocking the chemical reaction necessary for a substantially complete removal of the non-ferrous coating metal from the base metal bits or particles.

In the next step of the development of the invention, it was found to be necessary to provide a full counterflow of the stripping solution during a continuous forward advance of the aggregate, and that this could be attained by and only by moving the aggregate upwardly under vibration activation, while moving the aqueous chemical stripping solution directly downwardly upon and through the interstices of an advancing stream of the aggregate. In attempting to do this and obtain an in-line, continuous, full treatment on an effective and efficient basis, a vertical vibration activation of the aggregate was found to be highly essential. A study was made of so-called elevating spiral units which have been used, for example as set forth in the Spiess, Jr. et al. U.S. Pat. No. 2,744,066, for treating solid material with liquids in effecting an ion exchange between a treating resin and a liquid to be processed. However, contrary to the teaching of this patent, it was found that a helical pan of a wire mesh construction was totally unsatisfactory for the type of aggregate material herein involved and the type of reaction required.

For the purpose of assuring a continuous operation and a maximized loosening and removal of the resin covering from wire pieces, for example, it is necessary to use an aggregate which is provided by shredding scrap wire into small bits of not greater than about 0.375 of an inch in length and preferably with a range of 0.25 ± 0.125 inch and within a range of about 0.0048 up to 0.25 of an inch in diameter. Using an aggregate of bits this produced, it was found that bits tend to fall into, clog the mesh of and form a matt layer therewith, resulting in a lower level of the material that serves as a dampening and retarding agency for the forward activated advance of the upper level of the material. Also, from the standpoint of the desired counterflow of the liquid treating solution, difficulty was encountered in obtaining a full mingling of the treating solution with the small metal bits and its penetration through material-closed apertures of the mesh. This difficulty gave rise to considerable study as to whether or not it was possible to provide the desired forward advance, particularly of a wet aggregate of small bits under vibratory activation, and in such a manner as to obtain a full and effective mingling and reaction of a treating liquid in a downward counterflow path through the full extent of an aggregate bed and its thickness.

After unsuccessfully endeavoring to provide an effective wet stripping operation using various sizes of screen mesh and even a solid bottom wall for the pan, it was discovered that the provision of rows of narrow, spaced-apart slots or slits, for example, as formed by depressing the wall of the pan forwardly in the direction of desired advance of the aggregate, would solve the problem as to a suitable type of pan. Such a construction, as used with combing fingers enables a continuous advance of the aggregate without the forming of an under, clogging, matted layer of material, and minimizes any flow-through of the material with the gravity, down, through-flow of the treatment liquid. Forwardly bent or inclined, upwardly extending fingers enable the full width and depth of a vibration-activated bed of the aggregate to advance in a loosely maintained and non-matted relationship throughout its full thickness and in such a manner as to also enable a substantially complete liquid counterflow upon and through the aggregate flow bed without an appreciable loss of material through the passageway slits. For maximum efficiency of operation, it was determined that the slits should be placed in rows transversely across the pan in a forwardly to backwardly spaced relation with respect to each other and used with loosening fingers in an alternate and staggered relation along the surface of the pan and extending from unslit portions of the bottom wall thereof.

It was determined that the aggregate may have sufficient centrifugal force imparted therethrough to also enable the use of a similar vibration elevating type of apparatus having a pan provided with helical flights and activated, for example, by a pair of end-positioned, electric motor driven eccentrics, as a dry separator. Dry separation is needed for dividing an aggregate input into an outer, heavier content stream and an inner, lighter content stream in preliminarily concentrating the metal bit portion of the aggregate before the chemical stripping operation. In this type of utilization, a pan is used having a solid or closed-off bottom wall, but combing fingers are provided as well as side wings or baffles. The baffles are positioned and shaped to, in effect, skim heavier portions of the material that may tend to hold-down lighter portions, in order to free the lighter portions and enable them to move freely inwardly towards the central column of the unit. At the same time, this facilitates the inner movement and retention of the lighter portions, in order to facilitate the centrifugal outer movement of the heavier portions.

From the standpoint of the utilization of an aqueous chemical stripping solution, it was found that it would be practical, not only for removing a coating of tin or lead or an alloy thereof without alloying them to the base metal, but also for the removal of other non-ferrous coating metals, such as antimony, cadmium, silver and molybdenum or their alloys from a non-ferrous base metal, such as of copper or aluminum.

It has been found highly desirable to maintain the aggregate as an upwardly flowing bed of a uniform thickness across the pan. An optimum thickness of the bed should be within a maximum of about 2.5 cm or 0.98 of an inch; about 1 to 1.5 cm is a good operating range. Although a uniform thickness is desirable in the dry separating part of the process, it is very important in the wet stripping part thereof.

Summarized, in carrying out the invention, it was determined that it is necessary to effectively and continuously maximize the reduction of the resin content (if present) of the scrap material, representing its insulation coating. This is accomplished with the scrap material in a dry condition and by the use of vibration-activated, upward, spiral, centrifugal stream separation. For maximum efficiency, it is desirable to first eliminate any other extraneous metals, such as iron, by magnetic separation. It was found to be essential to effectively and continuously accomplish a chemical removal of coating metal while energizing and positively advancing the scrap material in the form of relatively small bits or pieces, in a relatively loose condition, and as a counterflowing stream with reference to the application of an aqueous chemical stripping solution. Such solution is made fully reactive to the coating metal, but not to the base or core metal of the bits or pieces.

Figure 1A:
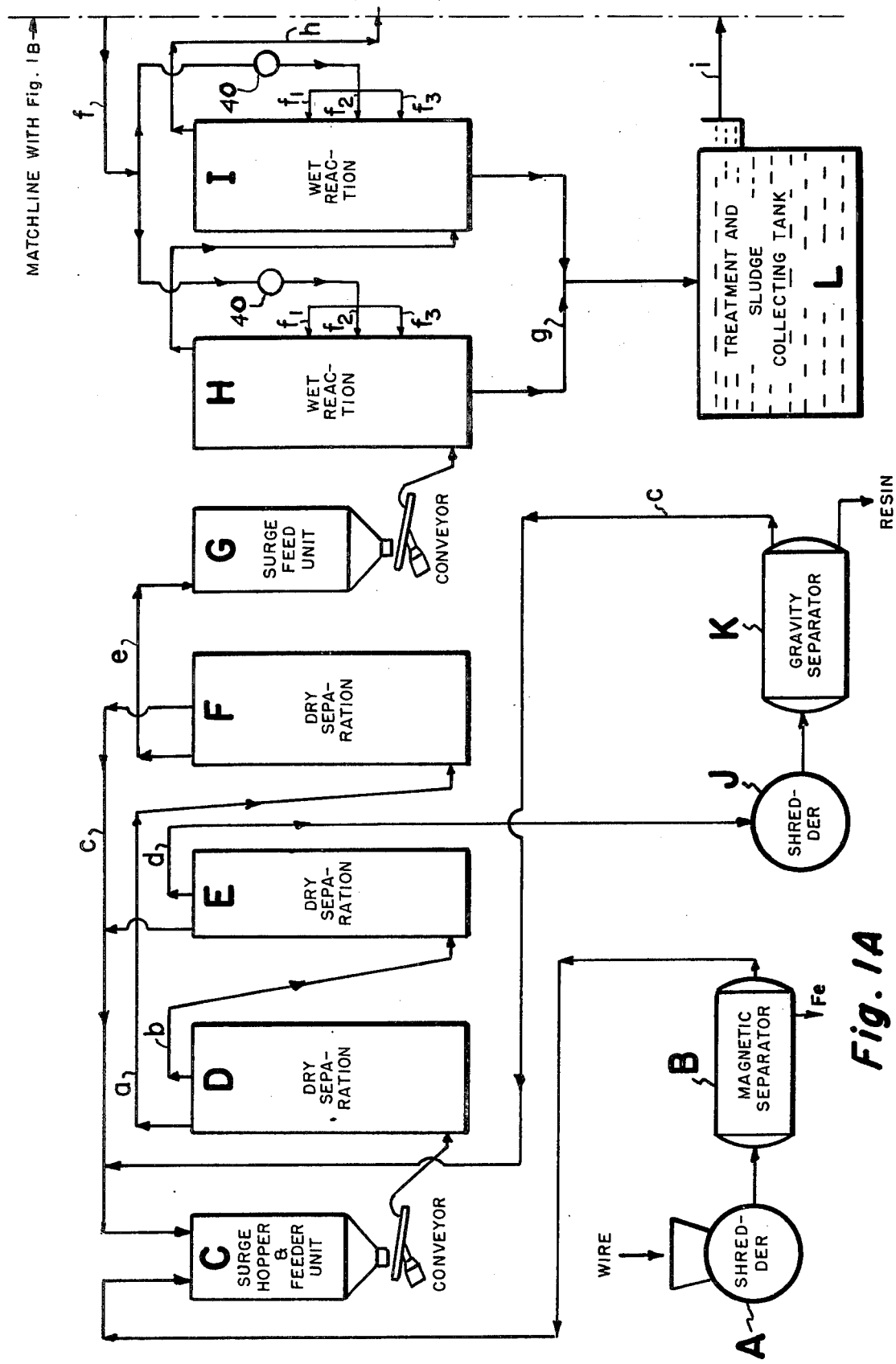

The base metal bits are directly recovered in clean metal form. They may be dewatered, rinsed, dried and stored or packaged for direct reuse in making desired products. The metal coating is carried as dissolved in the solution to a tank or bath at which the metal may be settled or precipitated and filtered out as shown in FIGS. 1A and B or in accordance with any conventional procedure, such as disclosed for example in the Lancy U.S. Pat. No. 3,764,503, and in such a manner, that the remaining solution may be enriched with requisite chemicals and then reused as a recycled product.

A very critical part of the process involves the way in which the aggregate containing metal bits of a requisite size and as an activated fluid stream of a substantially uniform depth or thickness, is under continuous vibratory upward movement, subjected progressively to a counterflow of an aqueous chemical solution, such that all the bits or particles of the aggregate have their surface areas substantially fully subjected thereto and stripped thereby. Control of the base metal ion content of the solution which may be an acid solution, using preferably sulfuric and/or hydrochloric acids, is effected to clean but not oxidize or eat away the base metal surface. The control of the movement is important during the application of the reacting solution from the standpoint of attaining a through-flow of the solution through the aggregate and of preventing a normal tendency of the aggregate to knit or mass together during such movement.

PREFERRED EMBODIMENT OF THE INVENTION

FIGS. 1A and 1B illustrate a practical system or procedure incorporating the discoveries and principles of the invention. As shown in FIG. 1A, scrap wire which may be insulated copper or aluminum coated wire, is fed into a shredder A which reduces it to requisite bit or particle lengths and loosens a considerable amount of the resin coating. The various steps are to be effected continuously and in-line. In the next step, the now shredded aggregate is shown passing through a conventional magnetic separator B to eliminate any ferrous materials or other magnetics that may be present. The aggregate then flows to a so-called surge hopper and feeder unit C which makes use of a feed hopper, as well as a horizontal bed type of vibrating conveyor. This combination unit provides a continuous feed of a uniform amount of the aggregate into the system of dry separators, beginning with dry separation unit D (see also FIGS. 3 and 4).

In the unit D, the outermost or heavier gravity or weight portion of the aggregate bits or pieces flow along line a into the bottom of a third dry separation unit F. On the other hand, the lighter portion of the aggregate flows along line b into the bottom of a second unit E. The heavier portion output of E is returned to the surge hopper C through line c, while the lighter portion flows through line d to a second shredder unit J. In the unit J, the lighter materials are further shredded and then passed into and through a gravity separator unit K to maximize the removal of the resin coating material. The gravity separator may be of a vibrating bed type such as illustrated, for example, in FIG. 14 of the drawings. The heavier and thus concentrated metal bit portion of the aggregate leaves the separator unit K through line c and is reintroduced into the surge hopper and feeder unit C for reprocessing through the dry separation units D, E and F.

Figure 6:
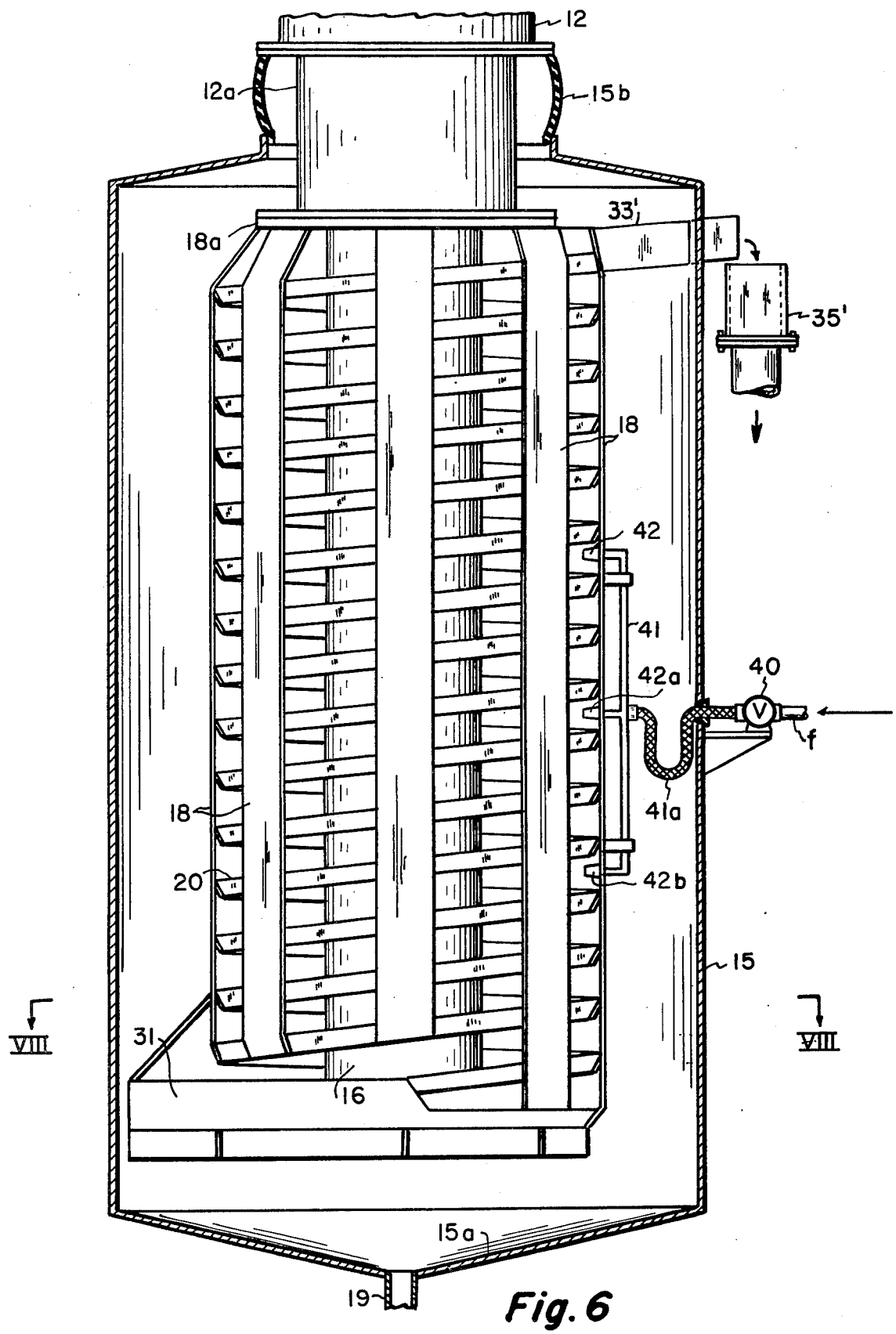
FIG. 6 is a vertical section on the scale of FIG. 5, illustrating a modified vibratory conveying unit or apparatus that is generally of the construction of and operated by the same means as shown in the unit of FIGS. 3 and 4; this apparatus, however, is illustrative of a unit which is used for a wet processing part of the system or procedure illustrated in FIGS 1A and 1B.
Figure 7A:
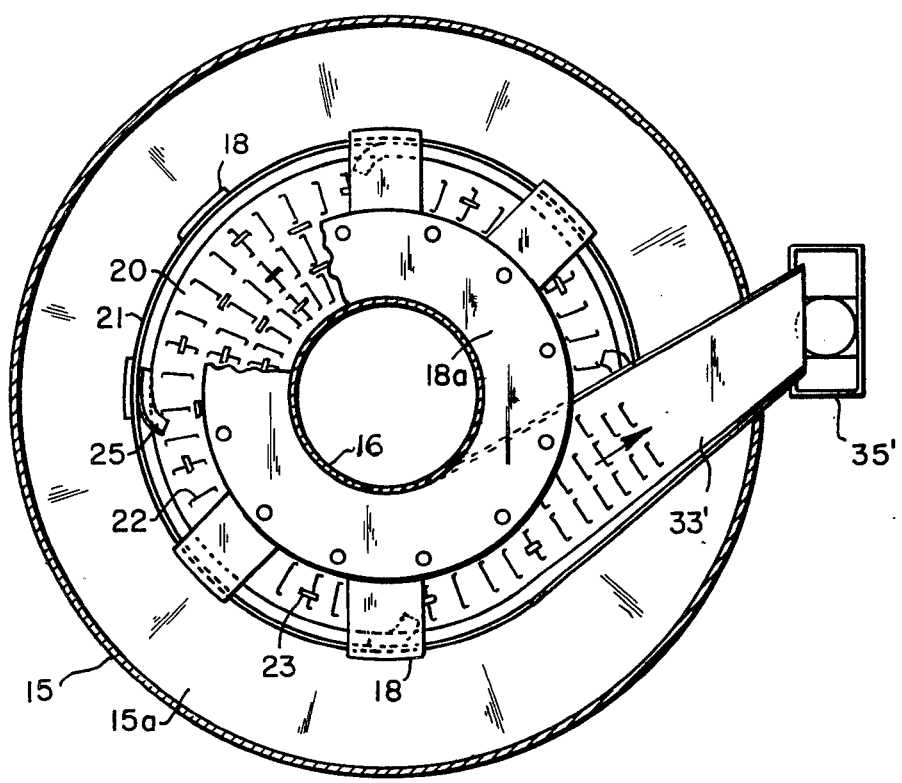
FIG. 7A is an enlarged top horizontal or plan view through an upper end of the apparatus of FIG. 6, somewhat similar to FIG. 7, but illustrating a single output flow means as used in a wet processing unit.
Figure 5A:
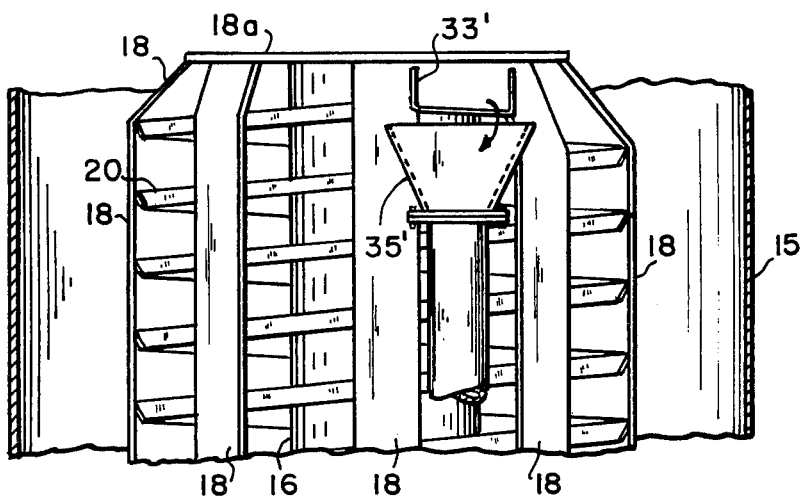
FIG. 5A is a side fragment in elevation on the same scale as and somewhat similar to FIG. 5, but illustrating single delivery means of a modified vibrating unit of FIG. 6.

The lighter portion of the output of the unit F also returns along the line c for reintroduction to the first unit D. On the other hand, the heavier portion from the unit F is passed through line e into a second surge feeder hopper and conveyor unit G which is of the same type as the unit C. The aggregate fed from the unit G now has a minimized resin content, of less than about 2% by volume, and is uniformly introduced into the bottom of the first wet reaction unit H. Such a type of unit is shown in FIG. 6. An aqueous chemical treating solution is introduced into the unit H, as well as into a second unit I from line f through valves 40 and through pipe header 41 of FIG. 6 and spray nozzles or heads 42, 42a and 42b (diagrammatically represented in FIG. 1A as $F_1$, $F_2$ and $F_3$). As shown in FIG. 6, the introduction of the aqueous solution is preferably effected into the flight spacing of a helical or spiral pan 20 at a spaced relationship from its upper end which may be about a third of the distance from the top. Thus, on such a basis, the distance the aqueous chemical solution is moved downwardly through the slits and over the metal bits of the aggregate will represent about two-thirds of the vertical extent of the pan (see FIG. 6). The solution is sprayed from a group of vertically spaced nozzles 42, 42a and 42b between spaced flights of the pan 20 to thus provide a gravity-induced counterflow of the treating solution at vertically spaced locations along the pan.

After the application of the stripping solution within unit H, the aggregate is then introduced into a second reactor unit I and the process repeated in order to provide a substantially full, uniform and complete removal or stripping of the non-ferrous metal coating from the base metal bit content of the aggregate. The used solution, as indicated, is removed through line g from the bottom of each of the units H and I and discharged into a treatment and sludge collecting tank L. In this tank, the metal coating which has been removed and dissolved in the solution may be collected as a precipitated oxide sludge. The aqueous content is then removed as shown from an upper level through line i and, as indicated in FIG. 1B, may be introduced into a reconditioning tank or zone M. A pH probe may be used to indicate the required amount of acid make-up etc. As shown, the reconditioned aqueous solution is then recycled through line f, as aided in its movement by a pump $P_1$.

Figure 14:
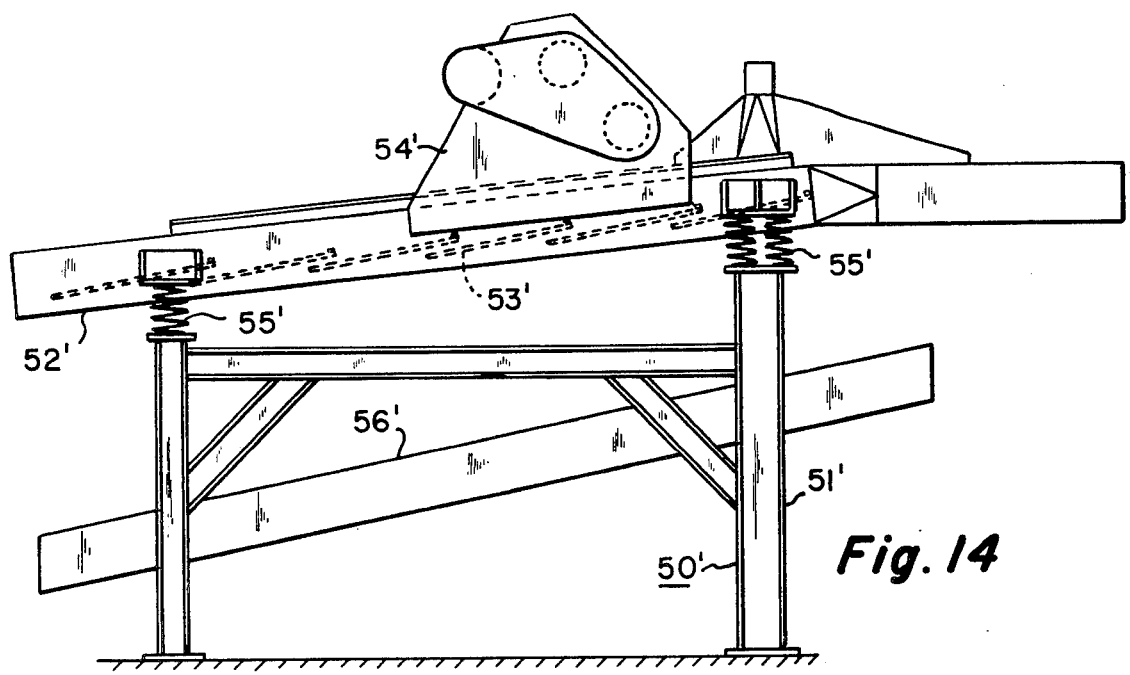
FIG. 14 is a representative side view in elevation of a vibration-activated, horizontally extending conveyor unit that may be used in shaking-off an aqueous solution carried over by the aggregate from a wet processing unit, before rinsing and drying.

The aggregate discharged from the wet unit I which has been purged of resin bits by the action of the stripping solution and which now essentially consists of base metal bits, is then moved along line h into a so-called dewaterer unit N. The unit N may be of any conventional commercial construction or of a type, such as illustrated in FIG. 14. The aggregate of base metal bits is continuously moved from the unit N and introduced into the bottom of a rinse unit O which also may be a spiral type of vibrator unit as represented, for example, in FIG. 6, except that water may be introduced at the top instead of along the side of the unit and utilized in a full flight length counterflow wash. The aggregate from the rinse unit O is then passed into and through a second dewatering unit P which may be of the same general construction as the unit N. In unit N a maximum of the adhering or carried-over water from the unit O is removed.

Figure 13:
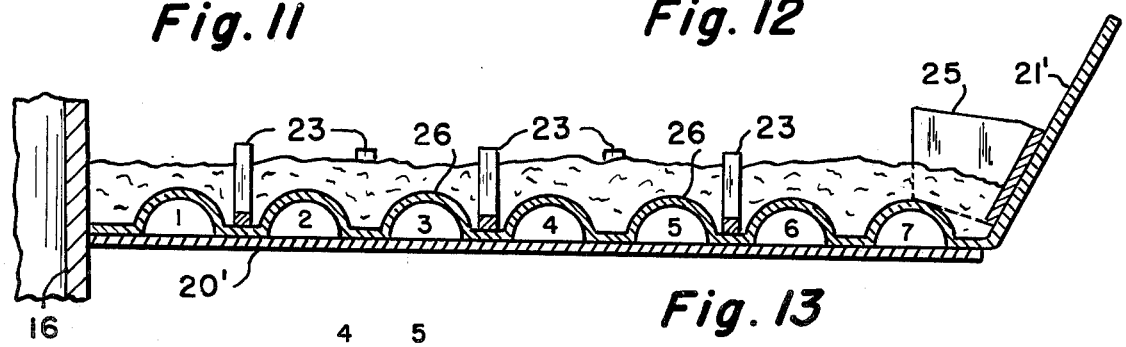
FIG. 13 is a section on the same scale as FIG. 10, but illustrating a modified form of pan construction that is used for indirectly applying steam heat for drying vibration-activated metal bits.
Figure 13A:
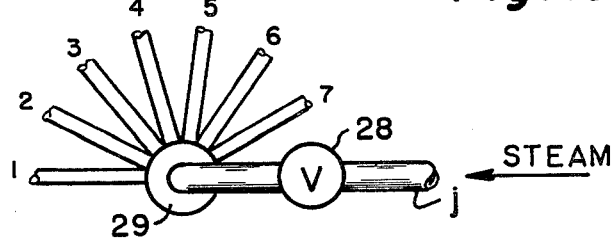
FIG. 13A is a somewhat diagrammatic fragment illustrating how jacketing of the pan of FIG. 3 may be supplied with drying steam from a common header.

The dewatered aggregate is then introduced into the bottom of a dryer unit Q which is also represented as an electrical vibrating unit and of the same general type as illustrated in FIG. 6, except that the pan is of a special construction shown in FIG. 13. Steam is introduced through the bottom end of the pan 20' from supply line j in the manner shown in FIG. 13A through a valve 28, a steam header 29 and a fan-shaped group of pipe members 1 to 7, inclusive. The pipe means supplies steam from the header 29 directly to steam jacket passageways 1 to 7, inclusive, that extend along the full length of the pan 20'. Cooled steam and condensate are exhausted from the unit Q through line k and may be returned to a boiler for reheating and for subsequent re-use.

The now dry aggregate of base metal bits which is discharged from the top of the unit Q is then moved into a dust remover unit R of any suitable commercial type. See also the unit illustrated in FIGS. 15 and 16 of the drawings. After any dirt and dust has been thus removed, the now clean and bright base metal bits, such as of copper or aluminum metal, are then shown as discharged into containers on a table S for storage, shipment and re-use. The processed base metal bits are about 99.99+% pure and of No. 1 grade.

The apparatus employed in carrying out the invention may be conventional apparatus as modified in accordance with the requirements thereof. In this connection, Detrex Chemical Industries, Inc. of Detroit, Mich. and the Syntron Division of FMC Corporation of Homer City, Pa., manufacture various forms of material handling and vibratory feeder equipment. Thus, a helical or spiral feeder unit that has a general construction of a commercial type from the standpoint of its activation may be used as modified in accordance with the showing of the drawings. For example, a stainless steel pan may be used in an electrical motor driven vibratory type of feeder which is modified from the standpoint of providing it with a substantially flat or planar bottom wall along its flights, with an outwardly inclined side flange 21 such as shown, by increasing the flights to a preferable number of about fifteen to eighteen, by adding fluid supply lines as indicated, by providing slit, louvered or slot portions 22, combing fingers 23 and wings, flutes or baffles 25, as indicated. Vibration inducing parts of conventional apparatus may be used.

Figure 4:
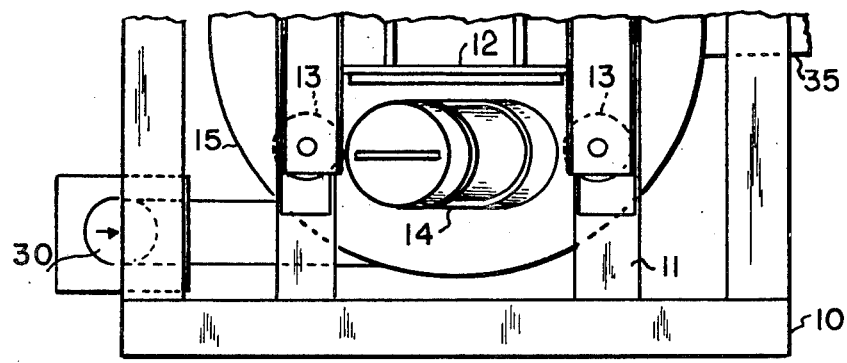
FIG. 4 is a fragmental top plan view of the apparatus of FIG. 3.
Figure 3:
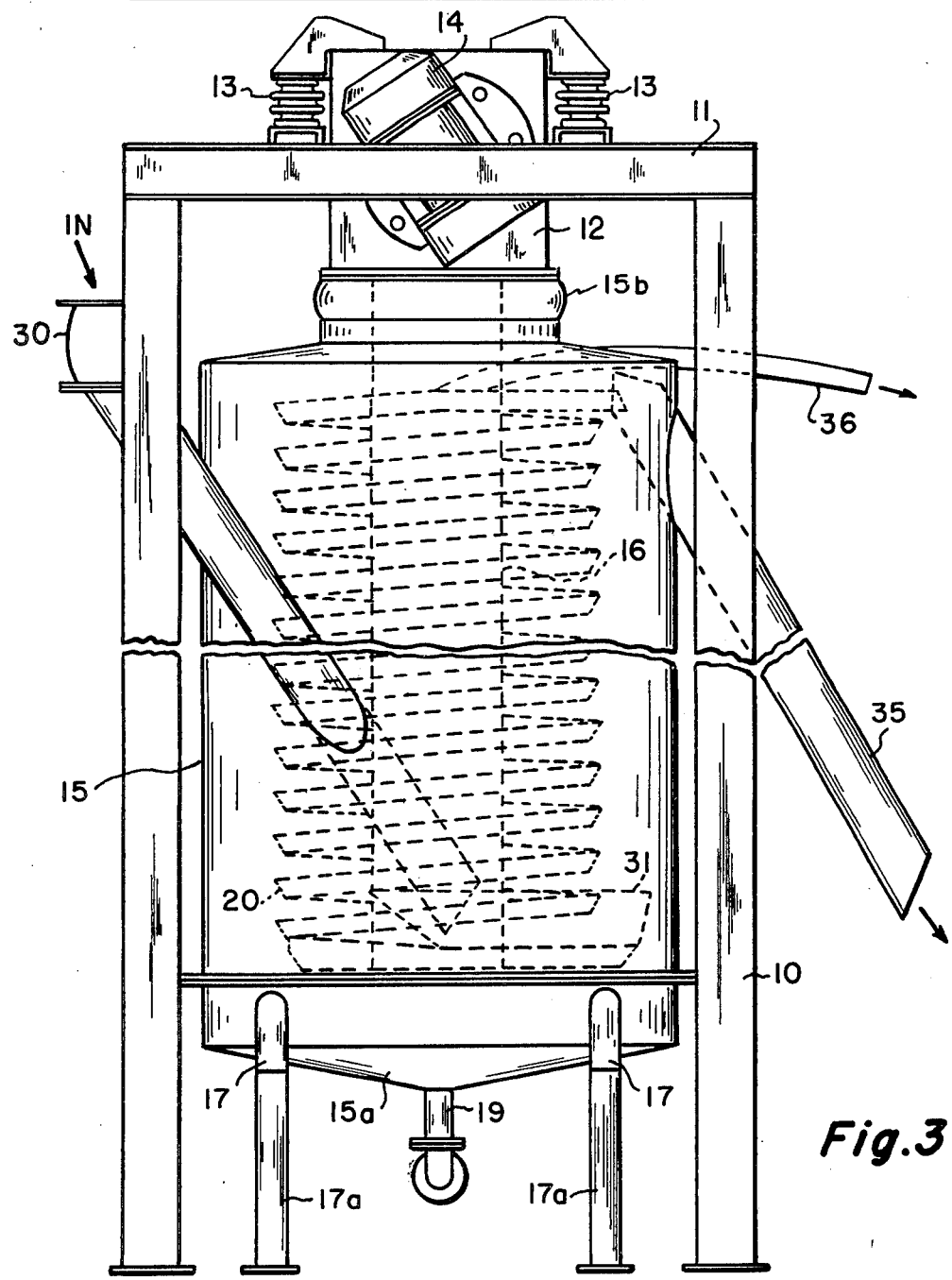
FIG. 3 is a side view in elevation showing a material elevating, vibration-activated unit, as specifically used for processing dry aggregate and separating the aggregate into an outer portion of heavier or greater specific gravity and an inner portion of lesser specific gravity, particularly for the purpose of at least reducing the amount of resin material in a shredded aggregate.

With reference to FIGS. 3 and 4, for example, a modified upright vibratory feeder is shown having a vertical support frame 10 and a top frame 11. A pair of motors are adjustably mounted to drive eccentrics (see unit 14). The vibration inducing unit 14 and a centrally disposed, vibrating, secondary frame 12 are flexibly positioned on the frame 11 by means of flexible air mounts 13. The motors of vibration unit 14 are conventionally mounted for adjustment as to their angular relations and will be utilized to provide an rpm of an optimum of about 1800 but which may be within a range of about 900 to 3,000. The lower end of the secondary frame 12 is shown flexibly connected through a resilient collar or gland 15b to an upper neck portion of an enclosing housing 15 for vertical flights of helical, material handling pan 20.

The pan 20 is secured to and mounted to extend along a central, cylindrical-shaped column 16 which, at its upper end, is directly carried by the secondary frame 12 for vibration therewith. A bottom end 15a of the housing 15 is shown converging to provide a central collecting area for any liquid or other discharge that may be taken-off through an outlet or drainage nipple 19. The drain nipple 19 serves as an outlet for a unit such as shown in FIG. 6 which is being supplied with an aqueous treating solution. The housing 15 is shown supported on legs 17 which may have a flexible cooperative positioning on direct floor mounted legs 17a.

Figure 7:
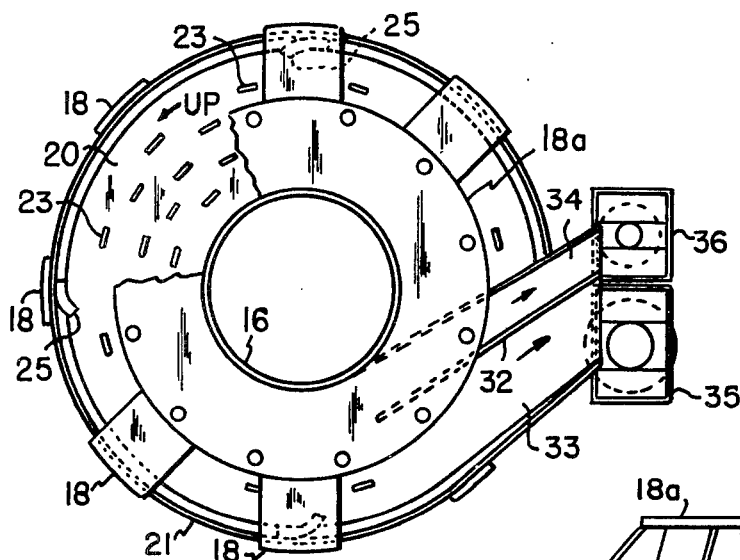
FIG. 7 is a top plan view of the apparatus shown in and on the scale of FIG. 3; it is partially broken-away to illustrate the use of combing fingers and side wings or baffles in a dry part of the process of FIGS. 1A and 1B.
Figure 5:
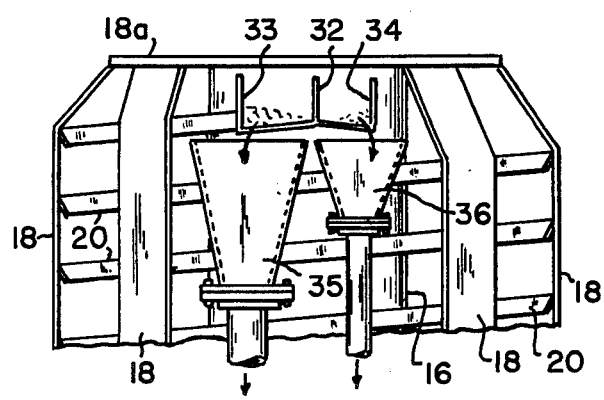
FIG. 5 is an enlarged side fragment in elevation of an upper portion of the apparatus of FIG. 3, taken from a delivery side thereof, and particularly illustrating inner parts or elements and dual delivery means of the apparatus; in this figure, the supporting framework and an outer housing have been removed.

In dry unit of FIGS. 3 and 4, the aggregate input is shown as introduced by a downwardly sloped inlet feed pipe 30 to a somewhat vertically enlarged bottom portion 31 of helical pan 20. If the apparatus of FIGS. 3 and 4 is to be used for dry separation (see the units D to F of FIG. 1A), then the two separated portions of the discharge may be handled by downwardly inclined output ducts 35 and 36. See also details of the construction of FIGS. 5 and 7. An upper circular flange 18a which projects from the column 16 serves as an uppermost limit for the movement of the aggregate. A central wall or partition 32 between delivery passageways 33 and 34 serves to maintain the separation between heavier and lighter portions of the discharge for introduction into respective down-flow discharge ducts 35 and 36.

As shown in FIG. 6, flights of the pan are secured together in a vertically spaced-apart advancing relation along their outer reaches by circumferentially spaced-apart, vertically extending strap members. One of the strap members 18 may serve, as shown in the figure, as a mount for the solution spray header as represented by the pipe 41.

Figure 8:
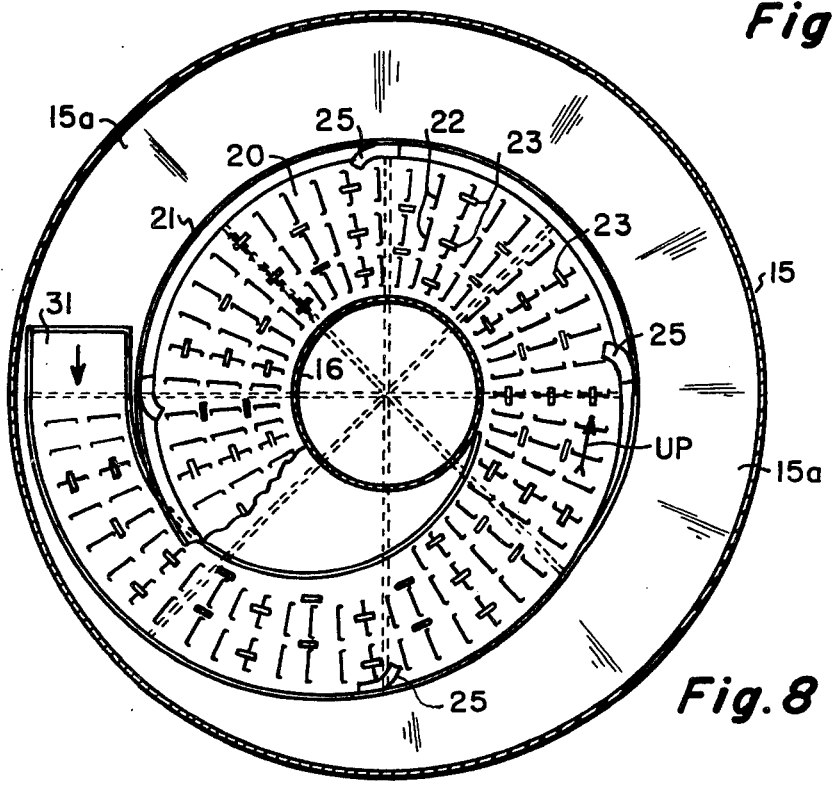
FIG. 8 is a horizontal section on the same scale as and taken along the line VIII—VIII of FIG. 6.
Figure 9:
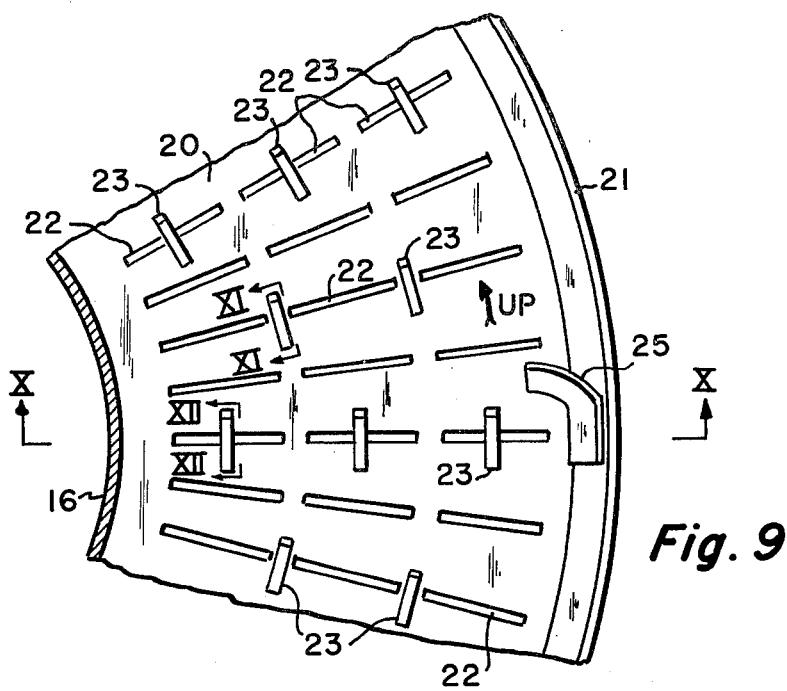
FIG. 9 is a greatly enlarged horizontal fragment taken across a flight of a pan of the apparatus shown in FIG. 8, showing details of the use of slot rows and of combing fingers, and of side wings or baffles that may be used for the pan of a wet apparatus, such as shown in FIGS. 5A, 6 and 7A; the side baffles are important for the pan of a dry unit but may be omitted in a so-called wet unit.
Figure 10:
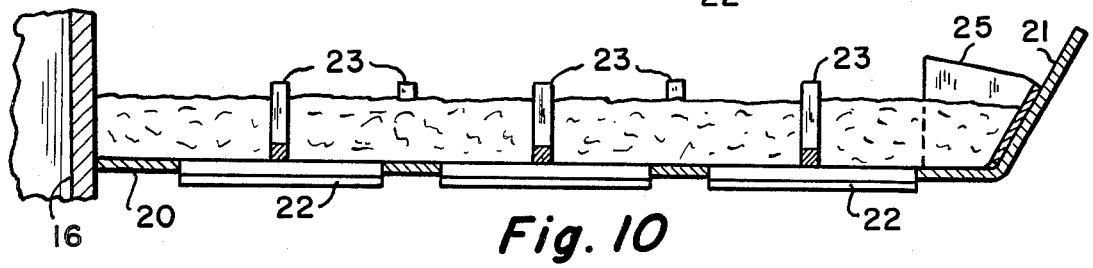
FIG. 10 is a further enlarged fragmental section taken along the line X—X of FIG. 9.
Figure 11:
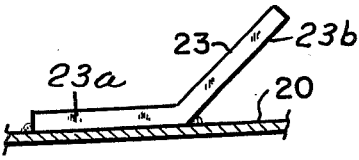
FIG. 11 is a side section in elevation on the scale of FIG. 10 and taken along the line XI—XI of FIG. 9.
Figure 12:
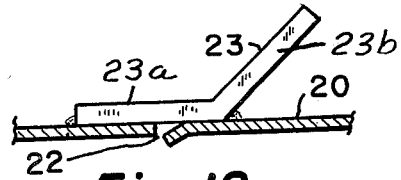
FIG. 12 is a section on the scale of FIGS. 10 and 11 and taken along the line XII—XII of FIG. 9.

FIGS. 8, 9, 10, 11 and 12 particularly illustrate the construction, mounting and utilization of a helical pan such as 20. FIG. 10 discloses that the bottom of the pan has a planar cross section, that its inner edge is secured to the central upright column or axis 16, and that its outer edge is defined by an upwardly outwardly inclined side flange 21, the side wall represented by the column 16 and the opposed side flange 21 thus provide a somewhat channel-shaped, transversely open pathway for upward movement of the aggregate. Rows of slits, slots or louvers 22 are provided with each slit portion being in a transversely spaced-apart, endwise-aligned relation with adjacent portions of the same cross-extending row, and with the rows being spaced along the length of the bottom wall of the pan 20 with a spacing that is greater than the spacing between the endwise portions of each row. As an optimum and as shown in FIG. 12, the forward or leading edge of each slit portion 22 has a vertical under-displaced relation which effectively limits washback of the aggregate during the counterflow of an aqueous chemical treating solution.

In the modified form of pan 20' shown in FIG. 13 that may be used in a dryer unit such as represented by unit Q of FIG. 1B, the bottom wall has a superimposed, corrugated plate wall 26 that is provided with an outwardly sloped side flange 21'. In this construction, the fingers 23 are mounted in the planar portions between adjacent, semi-circular offsets which define steam jacket passageways 1 to 7, inclusive. As will be appreciated, in a dry separation, the fingers 23 should be used and the side wings or baffles 25 may be used. The slit portions 22 are omitted.

The fingers 23 (see FIGS. 11 and 12) constitute slender, upstanding pieces or strips that are bent forwardly and upwardly at substantially their middle portions to provide an upward slope in the direction of movement of the aggregate. In a typical installation employing a spacing of 2 to 3 inches between slit rows, the fingers 23 may have a total overall length of about 3 inches. The combing fingers 23 are each shown provided with a substantially planar, lower, mounting foot portion 23a that is secured, as by weld metal, to the upper side of the pan 20. As indicated, the foot portion 23a is integrally connected to a forwardly inclined, upwardly extending and spaced leg portion 23b that extends therefrom. The fingers 23 are mounted in a transversely spaced relation with respect to each other as rows. As shown in FIGS. 9 and 12, alternate rows extend across one row of slit portions 22 and have a staggered relation with next adjacent finger rows whose fingers extend in the spacing between a row of slit portions. Also, as shown, the fingers 23 are provided for each third row of slit portions 22. Each slit portion 22, as shown in FIG. 12 as an optimum, has an under-opening that may be provided by a downward punching or depressing operation, such that the forward edge of the opening has an upward slope towards the planar face of the pan. By restricting the size of the opening to about 0.031 on an inch and thus forming it, the washback of the aggregate can be substantially limited so that it is within a maximum of 10%, although a 40% washback has been found to not mitigate against the practicability of the system or process. It will be apparent that any washback may be collected in a filter (not shown) interposed in the line g leading to the tank L or on a cross extending screen spaced below the outlet of the tank L and spaced above the sludge collecting bottom portion thereof. When sufficient base metal aggregate has been collected by the filter, it may be introduced into the feed unit G of the system.

By way of example, a pan 20 of about 12 to 18 flights has been used for a dry separation unit such as D or a wet reaction unit such as H. A cross angular relationship of the floor of the pan 20 from its outer flange 21 to the column 16 of about 7°± 2° was found to be acceptable in further assuring a substantial uniform depth of the bed of aggregate during its movement from a bottom to a top flight of the pan. An off-vertical mounted slope about 20° for the electric vibration inducing motors, operation at about 1800 rpm has been also found to be satisfactory. In the use of a wet unit such as H which employs rows of louvers or slit portions 22 and combing aggregate-loosening fingers 23 across the planar bottom wall of its pan 20, a satisfactory arrangement is represented where the slots constitute about 75% of the width of the base of the pan with 25% being represented by the solid spacing portions. An outer diameter of the pan 20 of about 4 to 6 feet was also found to be satisfactory.

In using a unit such as D for dry separation, as previously indicated, slit portions 22 are omitted in the pan surface and fingers 23 and side wings, flanges, baffles or flutes 25 are provided. The baffles 25 are mounted, as shown particularly in FIGS. 9 and 10, to extend inwardly of the outer flange 21 (or 21' ) towards the central support column 16 at a forward-inturned angle of about 30°. Each baffle 25 is also turned-over forwardly from its upper edge about 30° from the vertical and may be spaced at about a 90° interval with respect to adjacent flanges along the flights of the pan 20 (or 20' ).

The vibration of the pan 20, as employed with the above-mentioned outer to inner relationship of the floor or bottom wall of the pan and the circumferentially spaced positioning (see FIGS. 8 and 10) of the upwardly forwardly extending baffles 25, accomplishes a periodic application of inwardly inclined side pressure upon the upwardly freely moving aggregate to dislodge smaller bits from beneath larger bits thereof. This, with the centrifugal force of the upward movement, accomplishes an outward movement of the heavier bits or pieces and a central inward movement of the lighter bits or pieces during the upward movement of the aggregate along the bottom of the pan. As shown in FIG. 8, the baffles 25 are mounted at spaced intervals along the outer flange 21 and project inwardly at an angle of about 30° with respect thereto above the upper face of the bottom wall; their inward and forward turned relation from the vertical enables engagement with a top portion of the aggregate as it moves upwardly under vibration along the pan 20. In this manner, the lighter portions are freed for facilitating their inward movement under centrifugal force towards the central column 16.

With reference to the wet reaction units such as H and I of FIG. 1A, a relatively high ion concentration of the base metal is provided, for example, by the use of copper sulfate if copper is the base metal and sulfuric acid is the stripping acid. By way of example, a solution containing about 10 to 25% of sulfuric acid and about 10 to 25% of copper sulfate by volume has been found to be satisfactory for stripping a non-ferrous coating metal such as an alloy of tin and lead from a copper base metal, using the processing and equipment of the invention.

With reference to the representative apparatus of FIGS. 14 and 16, designated as vibration-activated, material-advancing units 50 and 50', each has a supporting skeleton metal frame 51 (51'), a material receiving, backwardly declining bed 52 (52'), and an electric motor-driven vibration-inducing part 54 (54') that is operatively connected to the bed. Each bed has a forwardly spaced series of overlapping, material supporting and advancing, vibration-activated, forwardly, upwardly inclined plates 53 (53'). Each bed 52 (52') is flexibly carried and supported on its frame structure 51 (51') by means of helical spring mounts 55 (55'). A backwardly declining tray 56 (56') extending longitudinally beneath the bed 52 (52') is shown provided to catch material that may drop from the bed. In the unit of FIGS. 15 and 16, dust may be removed by suction applied through inlet nozzles 58 and manifold 57. A conventional motor driven vacuum producing pump (not shown) may be connected to the manifold.

In carrying out the process, it is important to first reduce the resin content to not more than 2% by volume from the standpoint of so-called "free" resin or plastic insulating material. The free resin material is that which has been mechanically separated from the metal wire and which is to be physically removed as a preliminary step in the process to concentrate the dry metal content of the aggregate.

The process, on demonstration runs, has produced a recovery of copper that is about 99.99% pure from an 800 pound lot of Western Electric copper scrap, class 4.15 which is solid wire manufacturing reject scrap within a gauge range of about 18 to 24 and having resin coating of polyvinyl chloride (PVC) and polyethylene (PE). The scrap wire was first shredded and then washed with water before analyzing its content. A group of five specimens taken averaged about 2.96 g/kg or approximately 3,000 parts per million of tin coating and about 74.8 mg/kg or about 75 parts per million of lead coating. These two metals are the principle contaminants and are the most difficult to remove in attempting to attain substantially pure copper. The wire industry has very exacting criteria for copper that is considered to be suitable for reuse in wire making. That is, it should have less than 25 parts per million of tin and less than 5 parts per million of lead. So far as now known, the disclosed process is the only one capable of meeting these requirements.

Three sample specimens collected from a reaction run (see FIGS. 1A and 1B) of the Western Electric scrap above-mentioned were rinsed with water and given a final benzotriazole rinse. The beneficial properties of benzotriazole are set forth in the Lancy U.S. Pat. No. 3,457,219. The following remaining or residual content of tin and lead in the copper bits is indicated, with each item representing an average of three analyses of the content of three separate specimen portions taken at random intervals from the end of the production line:

| No. | Sn | Pb |
| --- | --- | --- |
| 1. | 24.7 mg/kg | 4.4 mg/kg |
| 2. | 24.7 mg/kg | 4.6 mg/kg |
| 3. | 21.3 mg/kg | 4.8 mg/kg |

The above indicates that the residual content of the two contaminating metals is minimal from the standpoint of the recovered copper which is thus about 99.99+% pure. The importance of the process is emphasized by the fact that the total wiring and cable manufacture-produced copper scrap per year amounts to about one-half to three quarters of a billion pounds in the U.S. In this connection, wire manufacture may generate an average of about 15% scrap.

I claim:

1. In a process for recovering a base metal such as copper or aluminum from metal wire having a coating of another metal such as tin, lead or an alloy thereof and a resin covering, first shredding the wire into an aggregate containing free resin material and relatively short-length metal bits of not greater than about 0.375 of an inch in length and within a range of about 0.0048 up to about 0.25 of an inch in diameter, preliminarily removing the free resin material from the aggregate to reduce its content to not more than about 2% by volume, thereafter advancing the aggregate in the form of an active bed of substantially uniform thickness along an upward helical path under vibratory action while applying an aqueous chemical solution thereto in a counterflow path with respect to and downwardly through the active bed and while reacting the solution with and removing the coating metal from the base metal of the bits, and the solution having a chemical content that is effectively reactive with the coating metal and that is of minimized reactiveness with respect to the base metal of the bits.

2. In a process as defined in claim 1, maintaining a thickness of the active bed of the aggregate of not more than about 2.5 cm during the upward movement of the aggregate.

3. In a process as defined in claim 2, the chemical content of the aqueous solution being an acid, and minimizing the effect of the acid content on the base metal by maintaining a relatively high ion concentration of base metal in the solution during its application to the aggregate of the bed.

4. In a process as defined in claim 2, interposing projecting fingers along the path of upward movement of the aggregate to prevent matting of the metal bits.

5. In a process as defined in claim 1, providing cross-extending narrow openings beneath the active bed of about 0.031 of an inch in width forwardly of the bed and a transverse inward declination of the active bed of about $7° \pm 2°$ along the helical path, and moving the aqueous chemical solution in a counterflow path downwardly through the active bed of one flight and the narrow openings therebeneath upon and through the active bed of and the narrow openings beneath successively lower flights of the helical path during the upward movement of the aggregate.

6. In a process for recovering a non-ferrous base metal from metal wire having a non-ferrous coating of another metal thereon, first shredding the wire into an aggregate containing relatively short-length coated metal bits of not greater than about 0.375 of an inch in length and within a range of about 0.0048 up to about 0.25 of an inch in diameter, removing a maximized amount of non-metallic material from the aggregate and concentrating the metal material content thereof while the aggregate is in a dry condition, thereafter advancing the remaining aggregate in the form of a vibration-activated stream of substantially uniform thickness along an upward helical path, providing an aqueous chemical solution that is effectively reactive with the coating metal, applying the aqueous chemical solution in a counterflow path to individual bits of the coated metal material of the activated stream during its upward helical path of advance, chemically reacting the solution with and removing the metal coating thereon from the metal bits, maintaining a relatively high ion concentration of the base metal in the solution to protect the base metal of the bits, and then taking-off base metal bits whose metal coating has been removed from an upper end of the helical path and washing and drying them for recovery as clean base metal bits.

7. In a process as defined in claim 6, maintaining the aggregate as a substantially even thickness bed during the upward movement of the metal bits along the helical path.

8. In a process as defined in claim 7, maintaining the bed thickness within a maximum of about 2.5 cm during its upward movement.

9. In a process as defined in claim 7, maintaining the substantially even bed thickness within an optimum range of about 1 to 1.5 cm during the upward movement of the metal bits.

10. In a process as defined in claim 6, combing the aggregate along its path of upward movement and maintaining the metal bits in a loosened relation therealong.

11. In a process as defined in claim 10, combing the aggregate with upwardly projecting fingers in a staggered relation along the path of upward movement of the metal bits.

12. In a process as defined in claim 6 wherein the aggregate is advanced upwardly along a helical pan having longitudinally spaced-apart cross-extending rows of slits therein, moving the aggregate upwardly across the slits while moving the aqueous chemical solution downwardly through the slits and over the metal bits for a distance representing at least about two thirds of the vertical extent of the pan.

13. In a process as defined in claim 12, periodically applying inwardly inclined side pressure to the upwardly moving aggregate to dislodge smaller bits from beneath larger bits of the aggregate.

14. In a process as defined in claim 6, concentrating the metal material content of the dry aggregate by advancing the aggregate upwardly under vibratory activation as a continuous stream along a helical path, separating the lighter portions from the heavier portions by moving the heavier portions outwardly under centrifugal force during the upward advance of the dry aggregate, and thereafter removing the lighter portions as an inner stream and the heavier portions as an outer stream from an upper end of the helical path.

15. In a process as defined in claim 6, moving the aggregate in its upward helical path employing a rate of vibration of about 900 to 3000 rpm.

16. In a process as defined in claim 6, employing an inorganic acid of the class consisting of nitric, sulfuric and hydrochloric acids as the reacting chemical of the aqueous solution, and employing a salt of the base metal within the aqueous solution sufficient to protect the base metal during the removal of the metal coating therefrom.

17. In a process as defined in claim 6, wherein the base metal is copper employing about 10 to 25% by volume of sulfuric acid and about 10 to 25% by volume of copper sulfate within the aqueous chemical solution which is being applied to remove the coating metal.

18. In a process as defined in claim 6, the helical path of upward movement constituting about 12 to 18 flights, providing an outer diameter of the bed during the upward movement of the aggregate within about 4 to 6 feet, and maintaining the thickness of the bed within a maximum of about 2.5 cm.

19. In a continuous overall process for recovering a non-ferrous base metal from electric wire having a coating of another metal thereon and a resin covering, shredding the wire into an aggregate containing relatively short length resin and coated metal bits of about 0.25 ± 0.125 of an inch in length and within a range of about 0.0048 up to a 0.25 of an inch in diameter, preliminarily removing any magnetic material from the aggregate, continuously and uniformly moving the aggregate successively into and along a system of dry separation units in each of which the aggregate is advanced under vibratory activation and centrifugal force as a continuous stream upwardly along a helical path at the top of which lighter bits are removed from an inner portion of the path and heavier bits are removed from an outer portion thereof, re-shredding a portion of the lighter bits and after gravity separating resin bits therefrom again moving such portion and other lighter portions through the system until the remaining aggregate contains less than 2% by volume of free resin material, feeding the remaining aggregate as a continuous stream into and along a system of wet reaction units in each of which the remaining aggregate containing principally metal coated metal bits is advanced under vibratory activation as a continuous stream upwardly along a helical path, providing an aqueous chemical solution that is effectively reactive to dissolve the coating metal of the aggregate, spray-applying the solution to the aggregate during its upward movement within the wet units substantially above the lower end of the helical path of its movement within the units, moving the solution in a downward counterflow path through the aggregate while continuing to subject it to vibratory activation and while combing it to avoid matting, chemically reacting and dissolving the metal coating of the coated metal bits in the aqueous solution while protecting the base metal of the bits, removing the reacted chemical solution with the coating metal dissolved therein, recovering the dissolved coating metal from the solution, reconditioning the solution and thereafter again applying it within the wet units, moving the aggregate from the wet reaction units and rinsing and dewatering and drying it, the rinsing being effected by moving the aggregate upwardly along a helical path under vibratory action while applying water in a counterflow path with respect thereto and downwardly through the upwardly moving aggregate, the drying being effected by moving the de-watered aggregate upwardly along a helical path under vibratory action while indirectly applying steam heat thereto during such movement, and finally removing dust from the dried aggregate and advancing the remaining clean base metal bits to a collection point.

20. An apparatus for dry-separating an aggregate containing small bits of resin insulation material and bits of metal wire which comprises, and upwardly projecting frame structure having a central column, a helical-shaped pan extending upwardly from a lower end of said frame about said column to define a continuous series of flights along said frame, motor-actuated vibratory means at one end of said frame operatively connected to said pan for vibrating it to activate and advance such an aggragate as an upwardly moving stream and for separating heavier and lighter portions of the aggregate under centrifugal action, said pan having a substantially planar bottom wall sloping inwardly at an angle at about 7°±2° with respect to the horizontal and having an upwardly projecting outwardly inclined outer flange therealong, a series of combing fingers having their base portions secured on the upper face of said bottom wall in a spaced-apart staggered relation along the helical extent of said pan, said fingers being inclined forwardly from the upper face of said bottom wall for maintaining the aggregate in a loose combed relationship during its movement along said pan, and baffles mounted at spaced intervals along said outer flange and projecting inwardly at an angle at about 30° with respect thereto above the upper face of said bottom wall and having about a 30° inward turn from the vertical for engaging a top portion of such an aggregate moving upwardly under vibration along said pan for freeing lighter under portions thereof and for facilitating their inward movement under centrifugal force towards said column, and means at the upper end of said pan for discharging heavier portions of the aggregate in a separated relation with respect to lighter portions thereof.

21. An apparatus for conditioning an aggregate containing resin and metal coated small metal bits which comprises, an upwardly extending and downwardly sloped helical pan defining a series of flights therealong, said flights having a bottom wall and side flange means defining a channel-shaped pathway for upward movement of the aggregate therealong, motor-actuated vibration means mounted at one end of said pan imparting a vibratory movement thereto for activating and advancing the aggregate upwardly therealong, said pan having cross-extending rows of through-extending slit portions in a spaced relation longitudinally along said bottom wall of said flights, means for applying a counterflow of fluid downwardly through said slit portions during an upward flow of the aggregate along said pan, a plurality of upwardly projecting aggregate-loosening fingers in a spaced-apart relation forwardly along and across said pan and in a cooperative relation with respect to said slit portions for combing and maintaining the aggregate in a loosened relation on said bottom wall during its upward movement, said fingers being secured to project upwardly in a forwardly inclined relation from said pan and being mounted in a staggered relation therealong, baffles mounted on said pan to extend inwardly at about a 30° angular relation from an outer side flange thereof, and said baffles having about a 90° spacing with respect to each other along said pan.

22. An apparatus as defined in claim 21 wherein each of said baffles is turned-over forwardly from its upper edge about 30° from the vertical.

23. An apparatus for conditioning an aggregate containing resin and metal coated small metal bits which comprises, an upwardly extending and downwardly sloped helical pan defining a series of flights therealong, said flights having a bottom wall and side flange means defining a channel-shaped pathway for upward movement of the aggregate therealong, motor-actuated vibration means mounted at one end of said pan imparting vibratory movement thereto for activating and advancing the aggregate upwardly therealong, said pan having cross-extending rows of through-extending slit portions in a spaced relation longitudinally along said bottom wall of said flights, means for applying a counterflow of fluid downwardly through said slit portions during an upward flow of the aggregate along said pan, a plurality of upwardly projecting aggregate-loosening fingers in a spaced-apart relation forwardly along and across said pan and in a cooperative relation with respect to said slit portions for combing and maintaining the aggregate in a loosened relation on said bottom wall during its upward movement, each said slit portion being defined by a backwardly declining depressed leading edge portion and having a narrow opening of about 0.031 of an inch lengthwise of said pan, a group of said slit portions extending in a spaced relation transversely of said pan to define a row thereacross, said rows of slit portions having about a 2 to 3 inch spacing therebetween, and said fingers having about a 3 inch length and substantially half their lengths being bent forwardly along and at a spaced relation above said pan.

24. An apparatus for conditioning an aggregate containing resin and small metal bits which comprises, an upwardly extending and downwardly sloped helical pan defining a series of flights therealong, said flights having a bottom wall and an inner side wall with an opposed outer side flange defining a smooth channel-shaped transversely-open pathway for upward movement of the aggregate therealong, motor-actuated vibration means mounted at one end of said pan to impart vibratory movement thereto for actuating and flowing the aggregate upwardly as a substantially even thickness bed along said bottom wall, a plurality of aggregate combing fingers mounted on said bottom wall in a forwardly and transversely spaced-apart and staggered relation with respect to each other, each of said combing fingers having a bottom portion secured on said bottom wall and having an upwardly inclined portion extending forwardly therefrom for maintaining the metal bits in a loosened relation during their upward flowing movement along said bottom wall, baffles positioned in a forwardly spaced relation with respect to each other along said bottom wall and projecting transversely inwardly from said outer side flange for periodically applying inwardly inclined side pressure on the upwardly flowing aggregate to dislodge smaller bits from beneath larger bits of the aggregate, said pan separating the aggregate during its upward movement into an outer stream of heavier bits and an inner stream of lighter bits, and a pair of ducts positioned at an upper end of said pan to respectively receive the inner and outer streams therefrom.

25. An apparatus for conditioning an aggregate containing resin and small metal bits which comprises, an upwardly extending and downwardly sloped helical pan defining a series of flights therealong, said flights having a continuous bottom wall and an inner side wall with an opposed outer side flange defining a somewhat channel-shaped transversely-open pathway for upward movement of the aggregate therealong, motor-actuated vibration means mounted at one end of said pan to impart vibratory movement thereto for actuating and flowing the aggregate upwardly as a substantially even thickness bed along said bottom wall, said pan having longitudinally spaced-apart cross-extending rows of through-extending transversely elongated and endwise-aligned spaced-apart slit portions along the said bottom wall of said flights for passing a counterflow of fluid downwardly through said slit portions during an upward flow of the aggregate along said pan, a plurality of upwardly projecting aggregate-loosening fingers, each of said fingers having a substantially planar lower mounting foot portion and a forwardly inclined upwardly extending and spaced leg portion projecting from said foot portion, said fingers being in longitudinally spaced-apart rows, said fingers of each of said rows having their said foot portions secured in a forwardly extending and transversely spaced-apart relation on the bottom wall of said pan, the foot portions of alternative rows of said fingers being secured to extend across said slit portions of an associated slit portion row, and the foot portions of other rows of said fingers being secured to extend along transverse spaces between slit portions of the other rows of said slit portions for combing and maintaining the aggregate in a loosened relation on said bottom wall during its upward movement thereon.

26. An apparatus as defined in claim 25 wherein, means is positioned about one third of the distance downwardly from the upper end of said pan for applying a counterflow of fluid downwardly through said slit portions during the upward flow of the aggregate along said pan.

27. An apparatus as defined in claim 25 wherein, baffles are mounted on said pan to extend inwardly in an angular relation from an outer side flange thereof at forwardly spaced positions therealong, and said baffles are turned-over forwardly from their upper edges from the vertical for periodically applying inwardly inclined side pressure on the upwardly flowing aggregate to dislodge smaller bits from beneath larger bits thereof.

* * * * *